US012243022B2

(12) United States Patent
Chen

(10) Patent No.: US 12,243,022 B2
(45) **Date of Patent: *Mar. 4, 2025**

(54) FORM AUTHORITY GRANTING METHOD BASED ON TIME PROPERTY FIELDS OF FORM

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 306 days.

This patent is subject to a terminal disclaimer.

(21) Appl. No.: 16/628,546

(22) PCT Filed: Jul. 3, 2018

(86) PCT No.: PCT/CN2018/094321

§ 371 (c)(1),
(2) Date: Jan. 3, 2020

(87) PCT Pub. No.: WO2019/007338

PCT Pub. Date: Jan. 10, 2019

(65) Prior Publication Data

US 2020/0219063 A1 Jul. 9, 2020

(30) Foreign Application Priority Data

Jul. 4, 2017 (CN) ........................ 201710539641.8

(51) Int. Cl.
*G06Q 10/1091* (2023.01)
*G06F 21/31* (2013.01)
*G06F 40/174* (2020.01)

(52) U.S. Cl.
CPC ......... *G06Q 10/1091* (2013.01); *G06F 21/31* (2013.01); *G06F 40/174* (2020.01)

(58) Field of Classification Search
CPC .. G06Q 10/1091; G06Q 10/103; G06F 21/31; G06F 40/174; G06F 21/604;
(Continued)

(56) References Cited

U.S. PATENT DOCUMENTS 7,703,021 B1 4/2010 Flam
7,734,999 B2 6/2010 Leung
(Continued)

FOREIGN PATENT DOCUMENTS

CN 101299694 11/2008
CN 101520875 9/2009
(Continued)

OTHER PUBLICATIONS

International Search Report from PCT/CN2018/094321, dated Aug. 30, 2018, with English translation from WIPO.
(Continued)

*Primary Examiner* — Rami R Okasha
(74) *Attorney, Agent, or Firm* — Ladas & Parry, LLP

(57) ABSTRACT

A form-authorizing method based on time property fields of a form is disclosed in the present invention, including: selecting one or more grantees; selecting a form, and displaying time property fields of which permission time ranges need to be set in the selected form; respectively setting a permission time range for each time property field, wherein the permission time range comprises one or more of the following six types: a time range from a time point, which is determined by going backwards from a current time for a fixed time length, to the current time, a time range from a start time to a current time, a time range from a deadline to a system initial time, a time range from a start time to a
(Continued)

<table>
<tr><td rowspan="2">Authorization object</td><td rowspan="2">Form</td><td colspan="3">Last authorization operator: Zhang San;<br>Operation time: 2015-5-6, 15:00</td></tr>
<tr><td colspan="3">Time property field</td></tr>
<tr><td rowspan="3">Department of marketing<br>√ Salesperson 1<br>Salesperson 2<br>Salesperson 3<br>……</td><td rowspan="3">Customer<br>√ contract<br>……</td><td>Creation time</td><td>Delivery time</td><td>……</td></tr>
<tr><td>Deadline:<br>2015-3-26, 17:00</td><td>Start time:<br>2016-7-26</td><td>……</td></tr>
<tr><td>Recent (1) year</td><td>……</td><td>……</td></tr>
</table>

deadline, a time range where a time field value is null, and a time range from a system initial time to a current time; and after completing setting the permission time ranges, saving the settings. In the present invention, the operation permissions within a period of time in the form can be authorized to a grantee according to actual needs, thus satisfying requirements for form authorization in various time-limited cases.

8 Claims, 6 Drawing Sheets

(58) Field of Classification Search
CPC ......... G06F 21/6218; G06F 2221/2141; G06F 2221/2137; G06F 2221/2145; G06F 21/30; H04L 63/102
See application file for complete search history.

(56) References Cited

U.S. PATENT DOCUMENTS

| | | | | |
|---|---|---|---|---|
| 8,255,419 | B2 * | 8/2012 | Grebenik | H04L 63/102 707/812 |
| 9,503,482 | B1 * | 11/2016 | Hugenbruch | H04L 63/105 |
| 11,366,652 | B1 * | 6/2022 | Pressacco | G06F 9/5072 |
| 2004/0006594 | A1 | 1/2004 | Boyer | |
| 2004/0030702 | A1 * | 2/2004 | Houston | G06F 16/90 |
| 2006/0047697 | A1 * | 3/2006 | Conway | G16B 50/10 |
| 2007/0208857 | A1 * | 9/2007 | Danner | H04L 63/102 709/226 |
| 2007/0250905 | A1 * | 10/2007 | Clark | G06F 21/6218 726/1 |
| 2008/0162707 | A1 * | 7/2008 | Beck | H04L 69/28 709/229 |
| 2009/0178102 | A1 * | 7/2009 | Alghathbar | G06F 21/6218 726/1 |
| 2010/0042680 | A1 | 2/2010 | Czyzewicz | |
| 2010/0306268 | A1 * | 12/2010 | Bhatti | G06F 16/1774 707/738 |
| 2011/0162046 | A1 * | 6/2011 | Forster | G06F 21/41 726/4 |
| 2011/0246253 | A1 * | 10/2011 | Yu | G06F 16/256 705/7.13 |
| 2011/0246867 | A1 | 10/2011 | Tsutsumi | |
| 2012/0036263 | A1 | 2/2012 | Madden | |
| 2012/0317621 | A1 | 12/2012 | Mihara | |
| 2013/0246470 | A1 * | 9/2013 | Price | G06F 16/13 707/783 |
| 2014/0280129 | A1 * | 9/2014 | Howarth | G06F 21/62 707/736 |
| 2015/0040234 | A1 | 2/2015 | Grack | |
| 2015/0106736 | A1 | 4/2015 | Torman | |
| 2016/0105409 | A1 * | 4/2016 | Torman | H04L 63/20 726/6 |
| 2016/0294881 | A1 * | 10/2016 | Hua | H04L 63/102 |
| 2018/0018448 | A1 * | 1/2018 | Schulze | H04L 63/105 |
| 2018/0197624 | A1 * | 7/2018 | Robaina | G06F 3/017 |
| 2020/0202024 | A1 | 6/2020 | Chen | |
| 2020/0218818 | A1 | 7/2020 | Chen | |

FOREIGN PATENT DOCUMENTS

| | | |
|---|---|---|
| CN | 101640687 A | 2/2010 |
| CN | 101673375 | 3/2010 |
| CN | 101699478 A | 4/2010 |
| CN | 102004868 | 4/2011 |
| CN | 101510238 B | 12/2011 |
| CN | 102902767 | 1/2013 |
| CN | 103455763 | 12/2013 |
| CN | 103473499 A | 12/2013 |
| CN | 103530537 | 1/2014 |
| CN | 103605916 | 2/2014 |
| CN | 104050395 | 9/2014 |
| CN | 104050401 | 9/2014 |
| CN | 104463005 | 3/2015 |
| CN | 104537488 | 4/2015 |
| CN | 104660599 | 5/2015 |
| CN | 104838386 | 8/2015 |
| CN | 105303084 | 2/2016 |
| CN | 105630759 | 6/2016 |
| CN | 105653977 | 6/2016 |
| CN | 105721487 | 6/2016 |
| CN | 105741084 | 7/2016 |
| CN | 105868357 | 8/2016 |
| CN | 106570406 | 4/2017 |
| CN | 106934243 | 7/2017 |
| CN | 107292588 | 10/2017 |
| CN | 107301336 A | 10/2017 |
| CN | 107330344 | 11/2017 |
| CN | 107370748 | 11/2017 |
| JP | 2010020525 | 1/2010 |
| KR | 20160084997 | 7/2016 |

OTHER PUBLICATIONS

Written Opinion from the International Searching Authority from PCT/CN2018/094321, dated Aug. 30, 2018, with English translation from WIPO.

Wang, Xinling, "Details of Functional Authority, Data Authority and Amount Authority in Accounting Information System", Accounting learing, No. 4, Apr. 15, 2009, pp. 34-35.

PCT International Preliminary Report on Patentability (Chapter II) from PCT/CN2018/094321 dated Sep. 21, 2019, and its English translation from WIPO.

International Preliminary Report on Patentability (Chapter II) from PCT/CN2018/092033 dated Sep. 26, 2019 with WIPO Translation.

International Search Report in the international Application No. PCT/CN2018/092033 mailed on Sep. 5, 2018 with WIPO Translation.

Written Opinion of the International Searching Authority in the international Application No. PCT/CN2018/092033 mailed on Sep. 5, 2018 and English translation provided by Google Translate.

International Search Report in the international application No. PCT/CN2018/093815, mailed on Sep. 21, 2018.

Written Opinion of the International Searching Authority in the international application No. PCT/CN2018/093815, mailed on Sep. 21, 2018 and English translation provided by Google Translate.

International Preliminary Report on Patentability (Chapter II) from PCT/CN2018/093815 dated Oct. 14, 2019.

International Search Report in the international application No. PCT/CN2018/100310, mailed on Nov. 7, 2018.

Written Opinion of the International Searching Authority in the international application No. PCT/CN2018/100310, mailed on Nov. 7, 2018 with English translation provided by Google Translate.

International Preliminary Report on Patentability (Chapter I) from PCT/CN2018/100310 dated Feb. 8, 2020.

Office Action from U.S. Appl. No. 16/639,064 dated May 24, 2022.

Office Action from U.S. Appl. No. 16/627,992 dated Feb. 9, 2022.

Office Action from U.S. Appl. No. 16/627,990 dated Apr. 13, 2022.

Notice of Allowance from Chinese patent Application No. 201810718926.2 dated Sep. 28, 2021, and its English translation from Global Dossier and Word translation and Word translation.

Office Action from Chinese patent Application No. 201810718926.2 dated Jan. 18, 2021, and its English translation from Global Dossier.

Office Action from Chinese patent Application No. 201810718926.2 dated May 28, 2020 with search report, and its English translation from Global Dossier.

Notice of Allowance from Chinese Patent Application No. 201810637427.0 dated Apr. 8, 2021, and its English translation from Global Dossier and Word translation.

Office Action from Chinese Patent Application No. 201810637427.0 dated Jan. 28, 2021, and its English translation from Global Dossier.

Office Action from Chinese Patent Application No. 201810637427.0 dated Jun. 10, 2020 with search report, and it English translation from Global Dossier.

Notice of Allowance from Chinese Patent Application No. 201810918785.9 dated Jan. 11, 2022, and its English translation

(56) References Cited

OTHER PUBLICATIONS from Global Dossier and Word translation.
Office Action from Chinese Patent Application No. 201810918785.9 dated Mar. 3, 2021 with search report, and it English translation from Global Dossier.

* cited by examiner

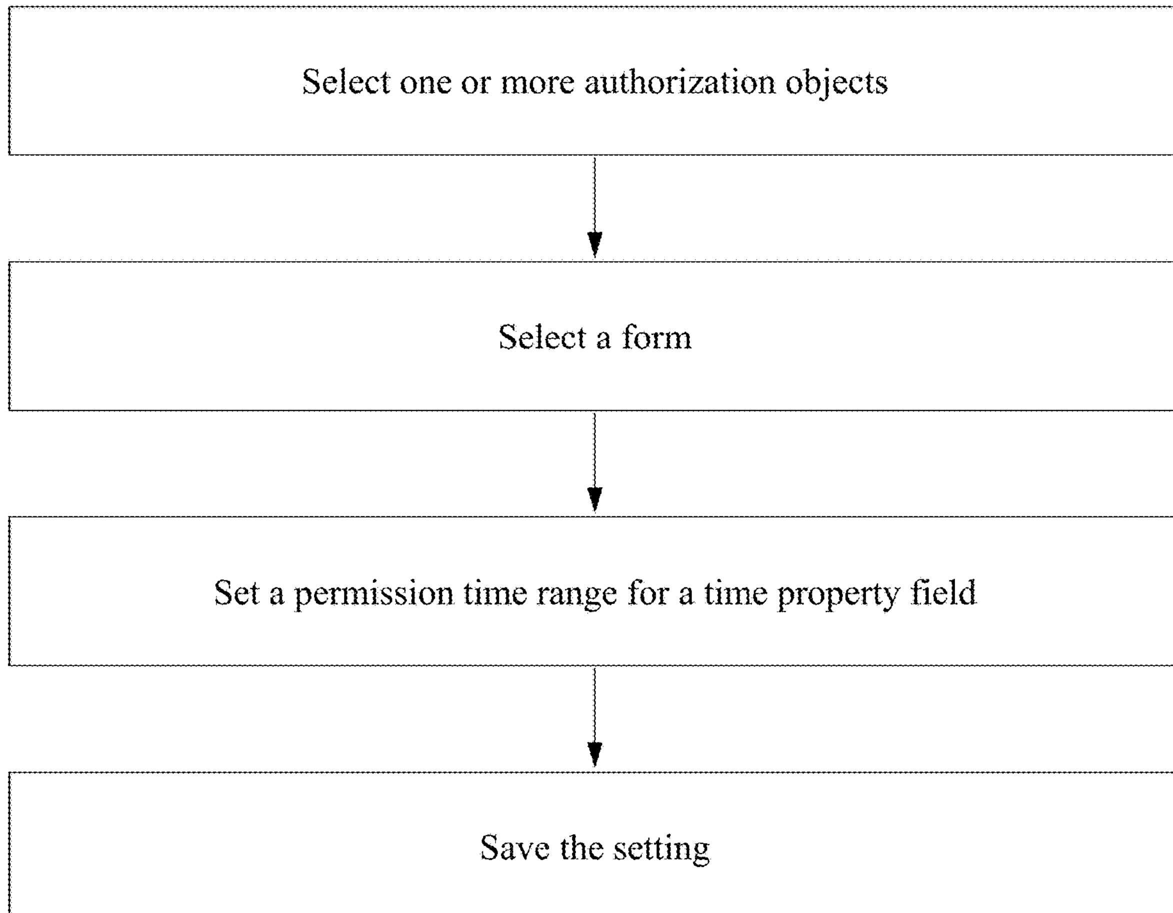

FIG. 1

<table>
<tr><th rowspan="2">Authorization object</th><th rowspan="2">Form</th><th colspan="3">Last authorization operator: Zhang San;<br>Operation time: 2015-5-6, 15:00</th></tr>
<tr><th colspan="3">Time property field</th></tr>
<tr><td rowspan="3">Department of marketing<br>√ Salesperson 1<br>Salesperson 2<br>Salesperson 3<br>……</td><td rowspan="3">Customer<br>√ contract<br>……</td><td>Creation time</td><td>Delivery time</td><td>……</td></tr>
<tr><td>Deadline:<br>2015-3-26, 17:00</td><td>Start time:<br>2016-7-26</td><td>……</td></tr>
<tr><td>Recent (1) year</td><td>……</td><td>……</td></tr>
</table>

FIG. 2

| Authorization object | Form | Recent authorization operator: Operation time: | | |
|---|---|---|---|---|
| | | Time property field | | |
| Department of marketing<br>√ Salesperson 1<br>Salesperson 2<br>Salesperson 3<br>...... | Customer<br>√ contract<br>...... | Creation time | Delivery time | ...... |
| | | | | |

FIG. 3

| Authorization object | Form | Recent authorization operator: Zhang San; Operation time: 2015-5-6, 15:00 | | | | | | |
|---|---|---|---|---|---|---|---|---|
| | | Time property field | View | Modify | Print | Delete | -- | Permission time range |
| Department of marketing<br>√ Salesperson 1<br>Salesperson 2<br>Salesperson 3<br>...... | Customer<br>√ contract<br>...... | Creation time | √ | | √ | | | Deadline: 2015-3-26, 17:00 |
| | | Delivery time | √ | √ | | | | Start time: 2016-7-26 |
| | | ...... | ...... | ...... | ...... | ...... | ...... | ...... |

FIG. 4

<table>
<tr><td rowspan="2">Authorization object</td><td rowspan="2">Form</td><td colspan="3">Last authorization operator: Zhang San;<br>Operation time: 2015-5-6, 15:00</td></tr>
<tr><td colspan="3">Time property field</td></tr>
<tr><td rowspan="4">Department of marketing<br>√ Salesperson 1<br>Salesperson 2<br>Salesperson 3<br>……</td><td rowspan="4">Customer<br>√ contract<br>……</td><td>Creation time</td><td>Delivery time</td><td>……</td></tr>
<tr><td>Deadline: 2015-3-26 (Field: Industry to which the customer belongs: Logistics industry)</td><td></td><td>……</td></tr>
<tr><td>……</td><td>Start time: 2016-7-26 (Field: Industry to which the customer belongs: Clothing industry)</td><td>……</td></tr>
<tr><td>……</td><td>……</td><td>……</td></tr>
</table>

FIG. 6

<table>
<tr><td rowspan="3">Authorization object</td><td rowspan="3">Form</td><td colspan="3">Recent authorization operator: Zhang San; Operation time: 2015-5-6, 15:00</td></tr>
<tr><td colspan="3">Authorization template: Created template 1</td></tr>
<tr><td colspan="3">Time property field</td></tr>
<tr><td>Department of marketing<br>√ Salesperson 1<br>Salesperson 2<br>Salesperson 3<br>......</td><td rowspan="2">√Customer contract<br>......</td><td>Creation time</td><td>Delivery time</td><td>......</td></tr>
<tr><td>Template<br>Created template 1<br>Created template 2<br>Created template 3<br>......</td><td>Deadline:<br>2015-3-26, 17:00</td><td>Start time:<br>2016-7-26</td><td>......</td></tr>
</table>

FIG. 8

FORM AUTHORITY GRANTING METHOD BASED ON TIME PROPERTY FIELDS OF FORM

CROSS-REFERENCE TO RELATED APPLICATIONS

This application is the U.S. national phase of PCT/CN2018/094321 filed on Jul. 3, 2018, which claims priority to Chinese Application No. 201710539641.8 filed on Jul. 4, 2017, the disclosures of which are incorporated by reference herein in their entireties.

BACKGROUND

Technical Field

The present invention relates to a form-authorizing method in a management software system such as ERP, and in particular, to a form-authorizing method based on time property fields of a form.

Related Art

In a conventional management software system such as ERP, authorizing an employee is that the employee is generally authorized according to the permissions of its post. After obtaining the permissions of a form, the employee can view all historical data and the current data of the form. However, in some cases, the leakage of company information is easily caused. For example, a new employee takes up a post of a company, but is not desired to view the historical data of the post. The employee can view the related historical data after obtaining the permissions of the post, and in this case, the company cannot take effective restriction measures, thus leading to leakage of company data. For another example, when an employee is temporarily transferred to review the data within a period of time in a form of another post, the permission to view the form needs to be authorized to the employee. After obtaining the permission, the employee can view all data of the form, causing leakage of other data in addition to the to-be-reviewed data in the form. Therefore, it can be learned that the existing form-authorizing method cannot achieve permission control effectively in some cases, which is adverse to information security of the company and easily causes loss to the company.

SUMMARY

Technical Problems

The object of the present invention is to overcome the deficiencies of the prior art, and provide a form-authorizing method based on time property fields of a form.

Solutions to Problems

Technical Solutions

The object of the present invention is achieved by the following technical solutions: A form-authorizing method based on time property fields of a form includes: selecting one or more grantees; selecting a form, and displaying time property fields of which permission time ranges need to be set in the selected form; setting permission time ranges for the time property fields, wherein a permission time range for each time property field is set respectively, said permission time range includes one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, said the time range from a system initial time to a current time includes the time range where the time field value is null; and after completing setting the permission time ranges, saving the settings. There is no sequence relation between the step of "selecting one or more grantees" and the step of "selecting a form, and displaying time property fields of which permission time ranges need to be set in the selected form."

Preferably, when there is one grantee, a permission time range value of a time property field is displayed as a value of the permission time range that is saved when the time property field is authorized at last time, and when there are two or more grantees, the permission time range value of the time property field is not displayed.

Preferably, the form-authorizing method further includes a step of setting an operation permission, wherein said operation permission includes one or more operations of viewing, modifying, adding, deleting or printing form data corresponding to a time property field, said form data is the data in the form in each permission time ranges of a time property field.

Preferably, said grantee includes one or more types of a person, a user, a group, a class, and a role, wherein said role is an independent individual not a group/class, one role can only be related to a unique user during the same period, and one user is related to one or more roles.

Preferably, a role belongs to a certain department, and the role is authorized according to work content of the role; a name of the role is unique under the department, and a number of the role is unique in a system; and during cross-department transfer of the user, the user's relation to the role in the original department is canceled, and the user is related to a role in a new department.

Preferably, the form-authorizing method further includes a step of setting a time property field.

Preferably, when there is one grantee, after the grantee and the form are selected, an operator and an authorization time that the time property field of the grantee's form is authorized at last time are displayed.

A form-authorizing method based on time property fields of a form includes: selecting one or more grantees; selecting a form, and displaying time property fields of which permission time ranges need to be set in the selected form; setting permission time ranges for the time property fields, wherein a permission time range for each time property field is set respectively, said permission time range includes one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, said the time range from a system initial time to a current time includes the time range where the time field value is null; and setting a limit field, wherein a limit field for a permission time range of a time property field that needs operation permission setting in the form is set, and said limit field is a field with a field value determined by selection or determined automatically, and an operation permission for data corresponding to the field value of the limit field is set; and saving the setting.

Preferably, when there is one grantee, a permission time range value of a time property field is displayed as a value of the permission time range that is saved when the time property field is authorized at last time, and when there are two or more grantees, the permission time range value of the time property field is not displayed.

A form-authorizing method based on time property fields of a form includes: selecting one or more grantees; selecting a form, and displaying time property fields of which permission time ranges need to be set in the selected form; selecting a template: selecting an existing grantee or a created template as an authorization template, and updating a permission time range value of the time property field to be a permission time range value of a corresponding time property field in the authorization template; setting permission time ranges for the time property fields: wherein a permission time range for each time property field is set respectively, said permission time range includes one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, said the time range from a system initial time to a current time includes the time range where the time field value is null; and after completing setting the permission time ranges, saving the settings.

Beneficial Effects of the Invention

Beneficial Effects

The present invention has the following beneficial effects:

(1) In the present invention, the operation permissions within a period of time in a form can be authorized to a grantee according to actual needs, and the grantee cannot operate the form data out of the time range, thus satisfying requirements for form authorization in various time-limited cases.

For example, if it is desired that an employee A can only operate the contract data after 2016, the start time of the permission time range of the contract signing time of the employ A's contract form is set to 2016. If it is desired that an employ B can only process the order data between 2013 and 2015, the start time and the deadline of the permission time range of the creation time of the employee B's order form are set to 2013 and 2015 respectively. The time range where the form data can be processed is set for each employee, so that each employee can only process the form data within the corresponding time range, thus reducing the possibility of the leakage of the form data and improving the security of the form data.

(2) When one grantee is authorized, the permission time range value of a time property field is displayed as a permission time range value that is saved when the time property field is authorized at last time, so that an authorization operator can make modifications on this basis, thus improving form authorization efficiency. Two or more grantees can be authorized at the same time, which improves authorization efficiency for batch grantees with exactly the same permissions or mostly the same permissions.

(3) When there is one grantee, after the grantee is selected, the operator and the authorization time that the time property field of the grantee's form is authorized at last time are displayed, which helps to track accountability when an error occurs in the grantee's permissions and determine whether to authorize the grantee.

(4) The permission time range value of a time property field is set to the permission time range value of a corresponding time property field in an authorization template, which can improve the form authorization efficiency, especially the authorization efficiency of mass forms with exactly the same permissions or mostly the same permissions.

(5) The conventional permission management mechanism defines the nature of a group, a work type, a class or the like as the role. The role is in a one-to-many relation to the user. In the actual process of using a system, the user's permissions often need to be adjusted during the operation process. For example, in processing the change in an employee's permissions, when the permissions of an employee related to the role have changed, it is improper to change the permissions of the entire role due to the change in the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(6) The conventional role authorization method with the nature of a group is prone to errors. The method provided in the present application significantly reduces the probability of authorization errors, because the method of the present application only needs to consider the role as an independent individual, without considering the commonality of multiple users related to the role having the nature of a group under the conventional method. Even if the authorization errors occur, only the user related to the role is affected. However, in the case of the conventional role having the nature of a group, all users related to the role are affected. Even if the authorization errors occur, the correction method in the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

(7) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(8) When a user is transferred from a post, if many permissions of the transferred user need to be assigned to other users, in processing, it is necessary to distinguish the permissions of the transferred user and creating roles to relate to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

(9) The role belongs to a department, and then the department to which the role belongs cannot be replaced. Reasons why the department to which the role belongs cannot be replaced are as follows. Reason 1: As the role in the present application is equivalent to a station number or a post number in nature, different station numbers or post numbers have different work content or permissions. For example, the role of a salesperson 1 under a sales department and the role of a developer 1 under a technical department are two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Description of the Drawings

Figure 5:
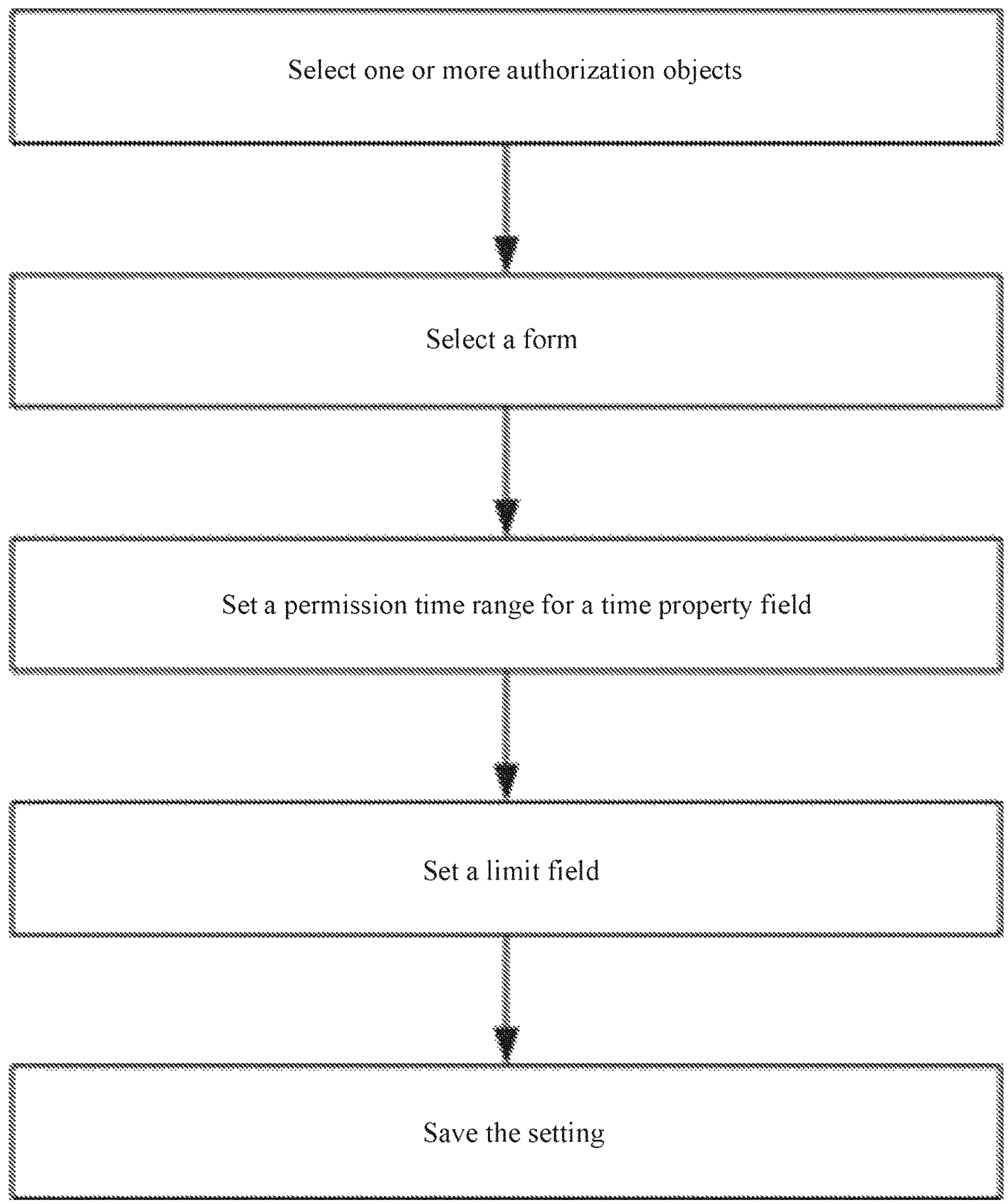
Figure 7:
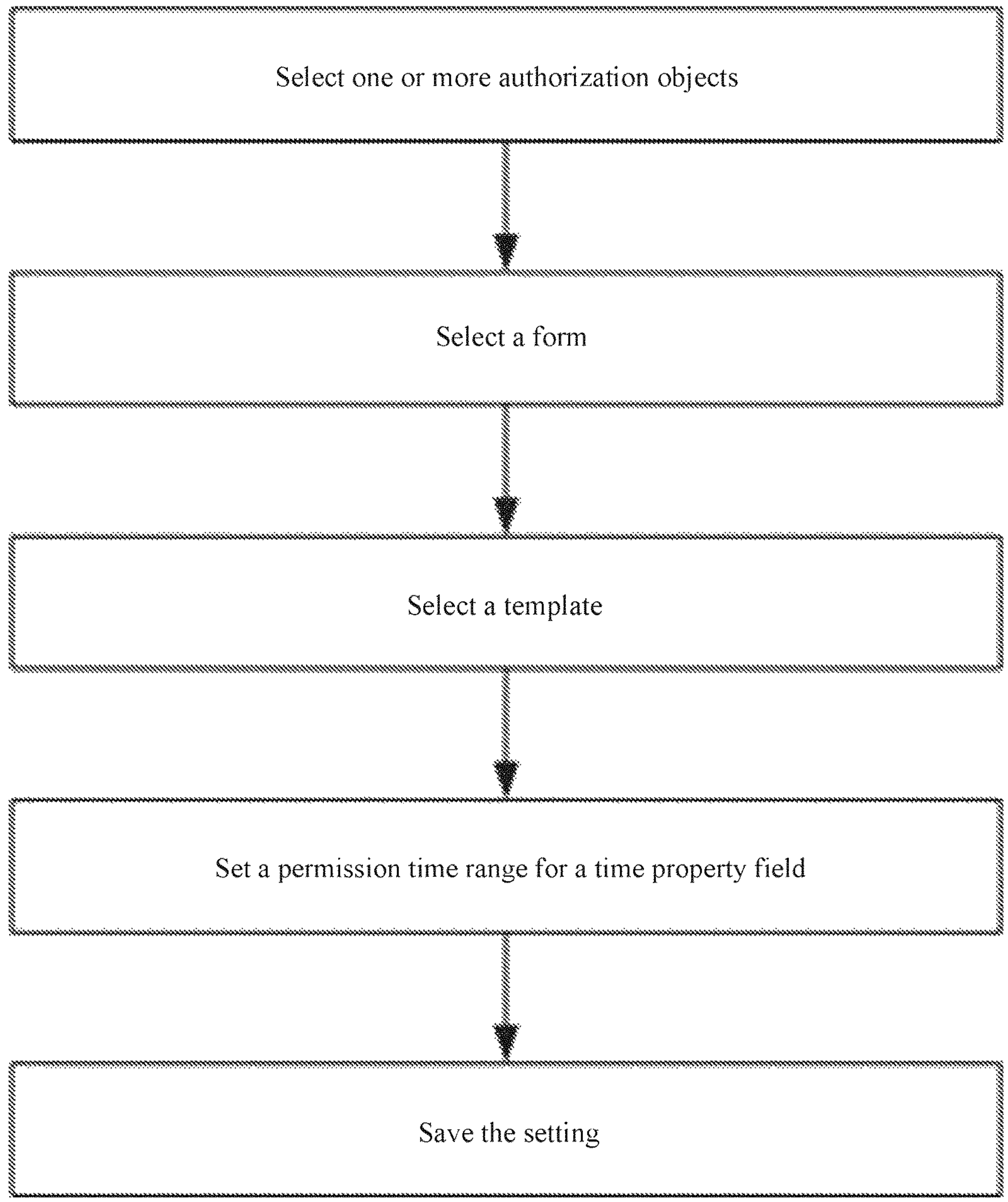

FIG. 1 is a flowchart of an embodiment in the present invention;

FIG. 2 is a schematic diagram with one grantee;

FIG. 3 is a schematic diagram with two grantees;

FIG. 4 is a schematic diagram of setting operation permissions for form data;

FIG. 5 is a flowchart of another embodiment in the present invention;

FIG. 6 is a schematic diagram of authorization performed according to a limit field;

FIG. 7 is a flowchart of still another embodiment in the present invention; and FIG. 8 is a schematic diagram of authorization performed according to an authorization template.

DETAILED DESCRIPTION

Description of Embodiments

The technical solutions of the present invention will be further described in detail below with reference to the figures, but the protection scope of the present invention is not limited to the following descriptions.

Embodiment 1

As shown in FIG. 1, a form-authorizing method based on time property fields of a form includes: selecting one or more grantees. The grantee includes one or more of a person, a user, a group, a class, and a role, the role is an independent individual not a group/class, one role can only be related to a unique user during the same period, and one user is related to one or more roles.

The role belongs to a certain department, and the role is authorized according to work content of the role; the name of the role is unique under the department, and the number of the role is unique in a system. The user determines permissions through its relation to the role, one employee corresponds to one user, and one user corresponds to one employee.

Definition of a role: A role does not have the nature of a group/a class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

A form is selected, and the time property fields of which permission time ranges need to be set in the form are displayed. The time property fields may be the fields related to time, for example, a creation time, a modification time, a delivery time and a payment time in a contract, and the like.

The form-authorizing method further includes a step of setting a time property field, so that the time property fields can be set according to actual needs, thus improving adaptability.

When there is one grantee, a permission time range value of the time property field is displayed as the permission time range value that is saved e when the time property field is authorized at last time, and when there are two or more grantees, the permission time range value of the time property field is not displayed. As shown in FIG. 2, a salesperson 1 has been selected as a grantee, and in recent authorization of the salesperson 1, the permission time range of a creation time is the time range with a deadline being 17:00 on Mar. 26, 2015, a start time being a system initial time, and the time range about 1 year from the current time; the permission time range of a delivery time is the time range with a start date being Jul. 26, 2016 and a deadline being the current time. In this case, the above permission time ranges of the creation time and the delivery time are displayed automatically, and the last authorization is completed by Zhang San at 15:00 on May 6, 2015. It should be noted that, the precision of the time points such as the start time and deadline in the permission time range in this embodiment may be year, month, day, hour, minute, second, and the like.

When there are two or more grantees, the permission time range value of the time property field is not displayed. As shown in FIG. 3, a salesperson 1 and a salesperson 2 are selected as grantees at the same time, and in this case, the permission time ranges of the creation time and the delivery time are not displayed.

When there is one grantee, after the grantee and the form are selected, the operator and the authorization time that the time property field of the grantee's form is authorized at last time are displayed, so as to determine whether the grantee needs to be authorized. For example, an operator needs to authorize 100 roles; however, the operator only finished authorizing 70 roles on that day. When the operator continued to authorize the role on the next day, a role to be authorized can be found by screening the authorization operators or the time of the last authorization of the time property field of the form. For another example, by viewing the last time when the time property field of the form is authorized to a role, it can be known how long the permissions of the time property field have remained unchanged, which helps to determine intuitively whether to re-authorize the time property field.

Permission time ranges are set for the time property fields: respectively setting a permission time range for each time property field, where the permission time range includes one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, where the time range from the system initial time to the current time includes the time range where the time field value is null. Both the start time and the deadline herein are the time set by the authorization operator.

The above six types of time ranges are described below by examples: a time range from a time point, which is determined by going backwards from a current time for a fixed time length, to the current time. For example, on Jun. 20, 2017, an employee A is authorized to view contract forms signed within a time range from a time point, which is determined obtained by going backwards 6 days from Jun. 20, 2017, to Jun. 20, 2017. That is, on Jun. 20, 2017, the employee A can view contract forms (contracts) signed from Jun. 15, 2017 to Jun. 20, 2017; on Jun. 21, 2017, the employee A can view contract forms (contracts) signed from Jun. 16, 2017 to Jun. 21, 2017; on Jun. 22, 2017, the employee A can view contract forms (contracts) signed from Jun. 17, 2017 to Jun. 22, 2017, and so on. That is, the time length of the time range is fixed, and the start time and the deadline are both variable.

The time range from a start time to a current time (the current time is dynamic). For example, on May 1, 2015, the employee A is authorized to view contract forms signed from Feb. 1, 2015 to the current date (current time). Then, the employee A can view all contract forms (contracts) signed from Feb. 1, 2015 to May 1, 2015; on May 2, 2015, the employee A can view all contract forms (contracts) signed from Feb. 1, 2015 to May 2, 2015 (further, the start time can be defined as excluding the start time, and when the start time is excluded, the employee A cannot view contracts signed on Feb. 1, 2015, and can only view all contracts signed after Feb. 1, 2015).

The time range from a deadline to a system initial time. For example, the employee A is authorized to view contract forms (contracts) signed from Feb. 1, 2015 to the system initial time. Then, the employee A can view all contract forms/contracts signed from Feb. 1, 2015 to the system initial time (that is, the employee A can view all contracts in the system signed on and before Feb. 1, 2015); (further, the deadline can be defined as excluding the deadline, and when the deadline is excluded, the employee A cannot view contracts signed on Feb. 1, 2015, and can only view contracts signed before Feb. 1, 2015; furthermore, the system initial time may not be set and only the deadline is set, and in this case, the employee A can view all contracts signed on and before the deadline, or the employee A can view all contracts signed before the deadline).

The time range from a start time to a deadline. For example, the employee A is authorized to view contract forms (contracts) signed from Feb. 1, 2015 to Jun. 1, 2015. Then, the employee A can view all contract forms (contracts) signed from Feb. 1, 2015 to Jun. 1, 2015.

The time range where a time field value is null. For example, a delivery time in a contract is not a mandatory field, and in some contract forms (contracts), the delivery time is not filled in. The employee A is authorized to view contract forms in which a time field value of the delivery time is null. Then, the employee A can view all contract forms (contracts) in which the delivery time is not filled in.

The time range from a system initial time to a current time (the current time is dynamic). For example, on Jun. 1, 2017, the employee A is authorized to view contract forms signed from the system initial time to the current time. Then, on Jun. 1, 2017, the employee A can view all contract forms (contracts) signed from the system initial time to Jun. 1, 2017; on Jun. 2, 2017, the employee A can view all contract forms (contracts) signed from the system initial time to Jun. 2, 2017, and so on. The time range from the system initial time to the current time includes the time range where the time field value is null (further, specific time values of the system initial time and the current time may not be set; as long as "the time range from the system initial time to the current time" is set for the employee A, the employee A can view all contracts in the system signed at any time, including null time).

After setting of the permission time ranges is finished, the setting is saved.

The form-authorizing method further includes a step of setting an operation permission. The operation permission includes one or more operations of viewing, modifying, adding, deleting and printing form data corresponding to the time property field, and the form data is the data in the form in each permission time range of the time property field. Therefore, the permissions of viewing, modification, addition, deletion, and printing can be authorized based on the form data corresponding to the time property field, thus improving the adaptability. As shown in FIG. 4, a salesperson 1 can view and print contract forms (contracts) created before 17:00 on Mar. 26, 2015, and view and modify contract forms (contracts) in which a delivery time is after Jul. 26, 2016.

Embodiment 2

As shown in FIG. 5, a form-authorizing method based on time property fields of a form includes: selecting one or more grantees. The grantee includes one or more of a person, a user, a group, a class, and a role, the role is an independent individual not a group/class, one role can only be related to a unique user during the same period, and one user is related to one or more roles.

The role belongs to a certain department, and the role is authorized according to work content of the role; a name of the role is unique under the department, and a number of the role is unique in a system. The user determines (obtains) permissions through its relation to the role, one employee corresponds to one user, and one user corresponds to one employee.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

A form is selected, and the time property fields of which permission time ranges need to be set in the selected form, are displayed.

The form-authorizing method further includes a step of setting the time property field, so that the time property fields can be set according to actual needs, thus improving the adaptability.

When there is one grantee, a permission time range value of the time property field is displayed as a value of the permission time range that is saved when the time property field is authorized at last time, and when there are two or more grantees, the permission time range value of the time property field is not displayed.

When there is one grantee, after the grantee and the form are selected, the operator and the authorization time that the time property field of the grantee's form is authorized at last time are displayed, so as to determine whether the grantee needs to be authorized.

the permission time ranges are set for the time property fields: respectively setting a permission time range for each time property field, where the permission time range includes one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, where the time range from the system initial time to the current time includes the time range where the time field value is null.

A limit field is set: setting the limit field for the permission time range of a time property field that needs to set the operation permission in the form, where the limit field is the field with the field value determined by selection (for example, an industry (field) to which a customer (form) belongs is selected from a manufacturing industry, a financial industry, an aircraft industry, and the like (field value options), and is not filled in manually) or determined automatically (for example, for a form creator, a form recorder, a form making role, a form making person, and the like (fields), their field values are automatically determined according to a related rule once the form (form data) is determined/saved), and setting an operation permission for data corresponding to the field value of the limit field. As shown in FIG. 6, a salesperson 1 can operate logistics-industry contract forms (contracts) created before Mar. 26, 2015, and operate clothing-industry contract forms (contracts) created after Jul. 26, 2016.

The above setting is saved.

Embodiment 3

As shown in FIG. 7, a form-authorizing method based on time property fields of a form includes: selecting one or more grantees. The grantee includes one or more of a person, a user, a group, a class, and a role, the role is an independent individual not a group/class, one role can only be related to a unique user during the same period, and one user is related to one or more roles.

The role belongs to a certain department, and the role is authorized according to work content of the role; a name of the role is unique under the department, and a number of the role is unique in a system. The user determines (obtains) permissions through its relation to the role, one employee corresponds to one user, and one user corresponds to one employee.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

A form is selected, and the time property fields of which permission time ranges need to be set in the selected form, are displayed.

The form-authorizing method further includes a step of setting the time property field, so that the time property fields can be set according to actual needs, thus improving the adaptability.

When there is one grantee, a permission time range value of the time property field is displayed as a value of the permission time range that is saved when the time property field is authorized at last time, and when there are two or more grantees, the permission time range value of the time property field is not displayed. When there are two or more grantees, the permission time range value of the time property field is not displayed.

When there is one grantee, after the grantee and the form are selected, the operator and the authorization time that the time property field of the grantee's form is authorized at last time are displayed, so as to determine whether the grantee needs to be authorized.

A template is selected: selecting an existing grantee or a created template as an authorization template, and updating a permission time range value of the time property field to be a permission time range value of a corresponding time property field in the authorization template. As shown in FIG. 8, a salesperson 1 is a grantee, the permission time range value of the creation time is set to the permission time range value of the creation time in the created template 1, and the permission time range value of the delivery time is set to the permission time range value of a delivery time in the created template 1.

Permission time ranges are set for the time property fields: respectively setting a permission time range for each time property field, where the permission time range includes one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, where the time range from the system initial time to the current time includes the time range where the time field value is null.

After setting of the permission time ranges is finished, the setting is saved.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. An authorization method for a user to access a form based on a time property field of the form in a computer management system, comprising:

selecting a grantee;

selecting the form, and displaying one or more time property fields in the selected form wherein one or more permission time ranges need to be set;

setting the one or more permission time ranges for the one or more time property fields, wherein the permission time range for each time property field is set respectively, said one or more permission time ranges comprise one or more of the following: a time range from a time point, which is determined by going backwards from a current time for a fixed time length, to the current time, a time range from a start time to a current time, a time range from a deadline to a system initial time, a time range from a start time to a deadline, a time range where a time field value is null, or a time range from a system initial time to a current time, said time range from the system initial time to the current time comprises the time range where the time field value is null, assigning the one or more permission time ranges to one or more roles in the computer management system;

wherein said grantee comprises a role of the one or more roles, wherein said role is an independent object in the computer management system which is not a group or class, wherein during a certain period, the role is configured to be related to the user only and the user is configured to be related to the role, or the role and at least one other role, the user is configured to obtain the one or more permission time ranges of said role, or said role and said at least one other role;

wherein each role of the one or more roles in the computer management system belongs to a department, and each role is authorized according to work content of the role; a name of each role is unique under the department, and a number of each role is unique in the computer management system; and during cross-department transfer of the user, the user's relation to a role in an original department is canceled, and the user is related to a new role in a new department.

2. The authorization method according to claim 1, wherein when there is one grantee, a permission time range value of the time property field is displayed as a value of the permission time range that is saved when the time property field is authorized at a last time, and when there are two or more grantees, the permission time range value of the time property field is not displayed.

3. The authorization method according to claim 1, further comprising:

setting an operation permission, said operation permission comprises one or more operations of viewing, modifying, adding, deleting or printing form data corresponding to a time property field, said form data is the data in the form in each permission time range of the time property field.

4. The authorization method according to claim 1, further comprising:

setting the time property field.

5. The authorization method according to claim 1, wherein when there is one grantee, after the grantee and the form are selected, an operator and an authorization time that the time property field of the grantee's form is authorized at a last time are displayed.

6. An authorization method for a user to access a form based on a time property field of the form in a computer management system, comprising:

selecting a grantee;

selecting the form, and displaying one or more time property fields in the selected form wherein one or more permission time ranges need to be set;

setting the one or more permission time ranges for the one or more time property fields, wherein the time range permission time range for each time property field is set respectively, said one or more permission time ranges comprise one or more of the following: a time range from a time point, which is determined by going backwards from a current time for a fixed time length, to the current time, a time range from a start time to a current time, a time range from a deadline to a system initial time, a time range from a start time to a deadline, a time range where a time field value is null, or a time range from a system initial time to a current time, said time range from the system initial time to the current time comprises the time range where the time field value is null, assigning the one or more permission time ranges to one or more roles in the computer management system; and setting a limit field for a permission time range of a time property field that needs operation permission setting in the form, wherein said limit field is a field with a field value determined by selection or determined automatically, and setting an operation permission for data corresponding to the field value of the limit field; and wherein said grantee comprises a role of the one or more roles, wherein said role is an independent object in the computer management system which is not a group or class, wherein during a certain period, the role is configured to be related to the user only and the user is configured to be related to the role, or the role and at least one other role, the user is configured to obtain the one or more permission time ranges of said role, or said role and said at least one other role;

wherein each role of the one or more roles in the computer management system belongs to a department, and each role is authorized according to work content of the role; a name of each role is unique under the department, and a number of each role is unique in the computer management system; and during cross-department transfer of the user, the user's relation to a role in an original department is canceled, and the user is related to a new role in a new department.

7. The authorization according to claim 6, wherein when there is one grantee, a permission time range value of the time property field is displayed with a saved value of the permission time range when the time property field was authorized at a last time, and when there are two or more grantees, the permission time range value of the time property field is not displayed.

8. An authorization method for a user to access a form based on a time property field of the form in a computer management system, comprising:

selecting a grantee;

selecting the form, and displaying one or more time property fields in the selected form wherein one or more permission time ranges need to be set;

selecting authorization of an existing grantee or an existing template as an authorization template, and updating a permission time range value of a time property field to be a permission time range value of a corresponding time property field in the authorization template;

setting the one or more permission time ranges for the one or more time property fields, wherein a permission time range for each time property field is set respectively, said one or more permission time ranges comprise one or more of the following: a time range from a time point, which is determined by going backwards from a current time for a fixed time length, to the current time, a time range from a start time to a current time, a time range from a deadline to a system initial time, a time range from a start time to a deadline, a time range where a time field value is null, or a time range from a system initial time to a current time, wherein the time range from the system initial time to the current time comprises the time range where the time field value is null, assigning the one or more permission time ranges to one or more roles in the computer management system;

wherein said grantee comprises a role of the one or more roles, wherein said role is an independent object in the computer management system which is not a group or class, wherein during a certain period, the role is configured to be related to the user only and the user is configured to be related to the role, or the role and at least one other role, and the user is configured to obtain the one or more permission time ranges of said role, or said role and said at least one other role;

wherein each role of the one or more roles in the computer management system belongs to a department, and each role is authorized according to work content of the role; a name of each role is unique under the department, and a number of each role is unique in the computer management system; and during cross-department transfer of the user, the user's relation to a role in an original department is canceled, and the user is related to a new role in a new department.

* * * * *